Dec. 7, 1948.  G. W. CRISE  2,455,738
ELECTROSTATIC AIR FILTER AND CIRCULATOR
Filed June 30, 1945

Inventor
George W. Crise

By H. S. McDowell
Attorney

Patented Dec. 7, 1948

2,455,738

UNITED STATES PATENT OFFICE 2,455,738

ELECTROSTATIC AIR FILTER AND CIRCULATOR

George W. Crise, Columbus, Ohio

Application June 30, 1945, Serial No. 602,551

8 Claims. (Cl. 183—7)

The present invention relates to air filters and circulators of the electrostatic type wherein precipitation of dust and other foreign particles is produced by subjecting the air to alternate potentials of electrostatic fields.

It has been well established that when air containing dust is subjected to a strong electric potential of constant polarity such as accrues when air is circulated in close proximity to highly charged electrodes, dust particles therein become electrostatically charged so that they are subject to strong attraction by any oppositely charged electrode which they approach or contact. In the past, many successful units have been built embodying this principle, but the size, cost and current required for their operation has limited their practical field of application.

Therefore, the object of my invention is to produce an air filter of this type of such simple and inexpensive construction as to make it more readily available to the general public.

Another object is to provide an air filter so constructed as to eliminate the need for electronic vacuum tubes, with their limited life and replacement costs, thus providing a unit requiring no replaceable parts during a prolonged period of normal use.

Another object is to provide an electrostatic air filter so constructed as to reduce current consumption to a small fraction of that heretofore required in filters of this general nature.

Another object is to provide a filter unit which will weigh but a few pounds, so as to make it readily portable and capable of being carried from room to room, for the convenience of those suffering from such ailments as hay fever.

Broadly, the principle of my invention resides in combining the functions of a fan motor, transformer, rectifier, electrodes and cabinet into a single compact and portable unit. For this purpose, I employ a synchronous motor carrying a synchronous commutator, said motor having on its stator high voltage windings for electrostatically energizing an air-circulating fan, the latter serving as a primary electrode and for forcing the air as charged through a fan guard of opposite polarity.

In connection with the above, I have also worked out certain novel details of construction and arrangements of parts, all of which are more fully developed in the following description and illustrated in the accompanying drawing, wherein.

Figure 1:
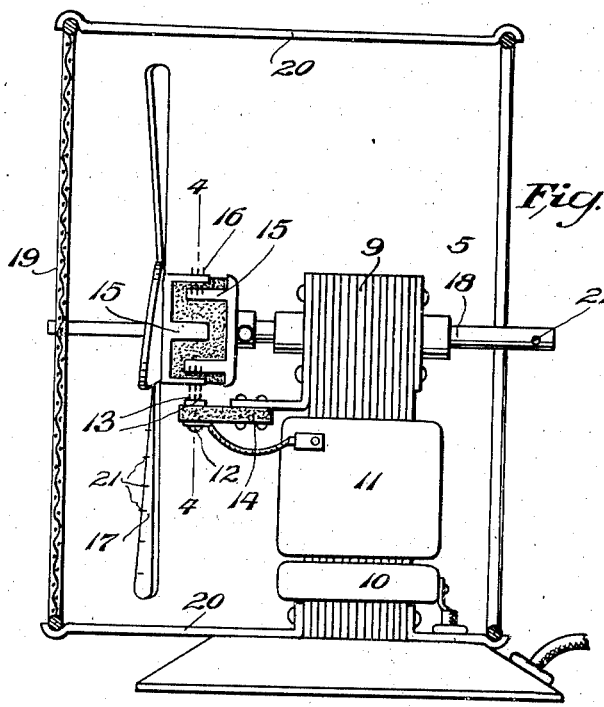
Fig. 1 is a side elevational view of an electrostatic air filter and fan formed in accordance with the present invention.

Referring to the drawings, the motor, indicated at 5, advantageously may be of the 8-pole synchronous type, designed to operate at 900 R. P. M. on standard 60 cycle current. The armature 6 of the motor is made preferably of laminated silicon-transformer steel and provided with poles 7 which correspond in spacing with the pole projections 8 formed on the stator 9, so that when started, the motor runs at a synchronous speed. The stator 9 has, in addition to a normal primary winding 10, a pair of high voltage windings 11, the latter being formed with high voltage terminals 12 which end in a group of sharp points, indicated at 13.

Figure 3:
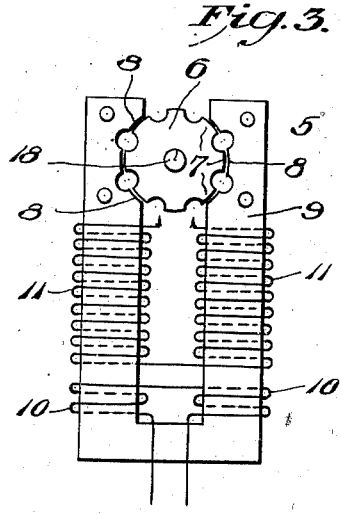
Fig. 3 is a diagrammatic view of the fan motor and its armature.
Figure 2:
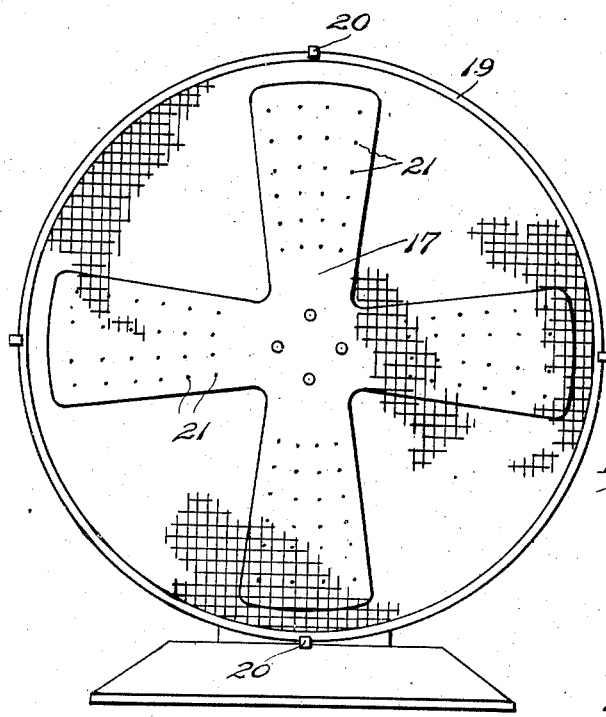
Fig. 2 is a front elevational view thereof.
Figure 4:
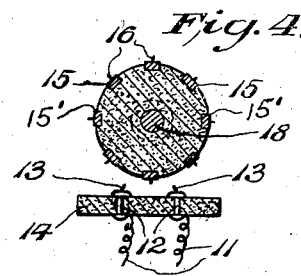
Fig. 4 is a detail vertical sectional view taken through the commutator of the fan on the plane indicated by the line 4—4 of Fig. 1.

By referring to Figs. 1 and 3, it will be noted that these barbed or sharp pointed electrode terminals are mounted on a fixed insulating support 14, the electrodes having spacings of approximately 45 degrees so as to register with the commutator segments shown at 15 and 15'. Each commutator bar is equipped with barbed or sharp pointed electrodes 16 which are positioned to register in close point to point relation with the electrode ends 13 as the commutator revolves. The commutator bars are alternately grounded and connected to the hub of the fan 17 and the motor shaft 18. The fan guard shown at 19 may be easily removed from its frame carried supports 20 for convenience in the cleaning thereof. The fan blades, if desired, may be provided with barbed points shown at 21 for the purpose of increasing electrostatic radiation when necessary.

The operation of my improved fan and filter may be summarized as follows: The motor primary winding 10 is energized with a standard alternating current. A cable, not shown, is passed through the opening 22 provided in one end of the motor shaft 18, and given a few wraps around the shaft, the cable being then pulled, bringing the fan up to 900 R. P. M. while it continues to run by the well known "electric engine" principle, in the same manner as is commonly used on many phonograph turntables. The commutator, which has the same number of segments as the armature has poles, and rotating with the same shaft, brings alternate sets of segments into registration with a pair of high voltage barbed terminals 13.

Current jumps from the terminals 13 to the barbed segments 15 and 15', by what is ordinarily known as brush discharge, as soon as the motor reaches its normal rotating speed, so that the fan and frame each change positions electrically as the current in the stator coils alternates, the barbed points of the brush terminals 13 and the electrodes 16 passing on the peak of each cycle. Since the fan as a polarizer commutes only the amount of current lost by radiation to the dust particles, practically no current flows between the terminal points after the motor has started. For example, if the motor drops into synchronism with its polarity positive, it will remain positive as long as it runs, and the motor and frame and connected guard will stay negative from the same source. If the fan frame is actually grounded, as by using an indicating plug, no potential will occur between the fan guard and the user. However, if no external ground is used, only a light static spark of negligible current can be felt by the user if the fan should be touched while in operation. The actual power potential exists between the fan and the guard, but this is not of a dangerous value due to the resistance of the windings which are required to supply only a fraction of one milliampere.

After the air passes through the fan 17, and is charged thereby, the dust particles are collected by and settle on the guard 19, which can be conveniently removed for periodical cleaning. It will be understood that a standard "squirrel cage" type of synchronous motor may be used in place of the type shown, in which case the fan is self starting if conventional windings are used. Such a standard motor, however, uses more current and is more expensive to build, but does not require any changes in the operating principles of my invention.

It will be noted that when the motor is running, and the high voltage coils 11 are energized, that since the number of commutator segments is the same as the number of armature pole pieces, both pole pieces and commutator segments move one position with each reversal of the field current, the commutator ends 15 and 15' remaining at fixed and opposite polarity by the well-known principle of commutation.

Since the commutator ends 15 are electrically connected to the motor shaft, frame and front screen by metallic contact, and since the fan 17, having the barbs 21, is connected to the opposite commutator ends 15', then the fan and guard screen must be at corresponding opposite potentials as long as the fan is in operation.

Inasmuch as the fan carries the electrically charged barbs 21 through the air at high speed, and since the fan sets relatively close to the fan guard screen which is of opposite polarity, a corona discharge will take place between the barb points 21 and the screen 19, and such corona will be in relatively close proximity to all dust particles which are in the air and through which the barbs 21 are driven.

As the air flows forward through the fan guard screen 19, all charged dust particles will be carried into close proximity with oppositely charged wire of which the mesh is constructed, and while it has been customary to use relatively large diameter connecting rods to prevent the tendency of corona formation on the collector electrodes, the comparatively large mesh screen illustrated provides the advantage of forcing all air to flow relatively close to the collector, so that dust particles need move only slightly from their neutral path to reach the surface of opposite potential.

I claim:

1. An electrostatic air filter and fan comprising: a synchronous alternating current motor including a stator having a frame, an armature, an armature shaft, a primary low-voltage winding on the stator, a secondary high-voltage winding disposed on the stator in inductive relationship to the low-voltage winding, and a current-rectifying commutator fixed to rotate with the armature shaft, a bladed fan rotatable with said commutator, a metallic fan guard carried by the stator frame, the periphery of said commutator being formed with electrically spaced bars carrying radially extending electrodes, alternate bars of said commutator being electrically joined with said armature shaft and said fan, and spaced sets of stationary electrodes joined with the secondary winding and insulated from said stator frame, said stationary electrodes being disposed in close physical relation to but without actual contact with the electrodes of said commutator bars.

2. An electrostatic air filter and fan structure comprising: a synchronous alternating current motor embodying a stator having a frame, an armature, an armature shaft, a primary low-voltage winding for the stator, a secondary high-voltage winding disposed on the stator in inductive relationship to the low-voltage winding, and a current-rectifying commutator fixed to rotate with the armature shaft, a bladed fan rotatable with said commutator, a metallic fan guard carried by said stator and electrically energized by its field, said armature being formed with poles, pole projections on the stator in registration with the poles of the armature, the periphery of said commutator being formed with electrically spaced bars carrying radially extending electrodes, alternate bars of said commutator being electrically joined with said armature shaft and said fan, and spaced sets of stationary electrodes joined with the terminals of the secondary winding, said stationary electrodes being insulated from said stator frame and arranged in close physical relation but out of actual contact with the electrodes of said commutator bars.

3. An electrostatic air filter and fan construction as specified in claim 2, and wherein the blades of the fan are provided with a multiplicity of electrodic projections.

4. An electrostatic air filter and fan construction as defined in claim 2, and wherein means are provided for removably mounting the fan guard in connection with the stator frame.

5. In combination with a synchronous motor having a stator and a motor winding, a high-voltage winding on the stator, a bladed air-moving fan driven by said motor, and a commutator for rectifying the current obtained from said winding and applying the same to said fan.

6. In combination with a synchronous motor having a stator and a motor winding, a high-voltage winding on the stator, a bladed air-moving fan driven by said motor, a commutator for rectifying the current obtained from said winding and applying the same to said fan, and a fan guard positioned in front of said fan and connected with said stator, said fan guard possessing a polarity during operation of said motor opposite to that of the fan blade.

7. In a device for cleaning air by electrostatic precipitation, a charging electrode, a precipitating electrode, and means for maintaining said electrodes at opposite polarity, said means including a rectifying commutator, a motor driving said commutator, said motor including a stator and a winding for imparting motive energy to the motor, a second winding wound on the stator of said motor for gathering high voltage from the motor winding, and conductors for leading power from the second winding to the commutator.

8. An electrostatic air filter and fan structure comprising: a synchronous alternating current motor embodying a stator having a frame, an armature, an armature shaft, a primary low-voltage winding for the stator, a secondary high-voltage winding disposed on the stator in inductive relationship to the low-voltage winding, and a current-rectifying commutator fixed to rotate with the armature shaft, a bladed fan rotatable with said commutator, a metallic fan guard carried by said stator and electrically energized by its field, said armature being formed with poles, pole projections on the stator in registration with the poles of the armature, the periphery of said commutator being formed with electrically spaced bars carrying radially extending electrodes, alternate bars of said commutator being electrically joined with said armature shaft and said fan, and spaced sets of stationary electrodes joined with the terminals of the secondary winding, said stationary electrodes being insulated from said stator frame and arranged in close physical relation with the electrodes of said commutator bars.

GEORGE W. CRISE.

REFERENCES CITED

The following references are of record in the file of this patent:

UNITED STATES PATENTS

| Number | Name | Date |
| --- | --- | --- |
| 895,729 | Cottrel | Aug. 11, 1908 |
| 1,343,285 | Schmidt | June 15, 1920 |
| 1,377,205 | Krause | May 10, 1921 |
| 2,129,785 | Penney | Sept. 13, 1938 |
| 2,297,933 | Yonkers | Oct. 6, 1942 |

FOREIGN PATENTS

| Number | Country | Date |
| --- | --- | --- |
| 287,649 | German | Sept. 30, 1915 |